United States Patent [19]

Petersen et al.

[11] E Re. 29,654

[45] Reissued May 30, 1978

[54] PREPARATION OF HYDROCARBON RESINS USING ZIRCONIUM TETRACHLORIDE

[75] Inventors: Kenneth C. Petersen, Scotia; Royal A. Meader, Jr., Ballston Spa, both of N.Y.

[73] Assignee: Schenectady Chemicals, Inc., Schenectady, N.Y.

[21] Appl. No.: 825,051

[22] Filed: Aug. 16, 1977

Related U.S. Patent Documents

Reissue of:

[64] Patent No.: 3,919,181
Issued: Nov. 11, 1975
Appl. No.: 405,455
Filed: Oct. 11, 1973

[51] Int. Cl.[2] ..... C08F 4/16

[52] U.S. Cl. ..... 526/90; 526/281; 526/336; 526/340; 526/346; 526/347; 526/916

[58] Field of Search ..... 526/90, 281, 336, 340, 526/346, 347

[56] References Cited

U.S. PATENT DOCUMENTS

| | | | |
|---|---|---|---|
| 1,939,932 | 12/1933 | Thomas | 260/93.3 |
| 2,060,404 | 11/1936 | Thomas et al. | 260/93.3 |
| 2,383,084 | 7/1945 | Rummelsburg | 526/194 |
| 2,389,240 | 11/1945 | Reid | 260/683.15 |
| 2,436,614 | 2/1948 | Sparks et al. | 260/93.5 R |
| 2,507,338 | 5/1950 | Heiligmann | 260/93.5 R |
| 2,556,488 | 6/1951 | Wakeford et al. | 260/93.5 R |
| 3,470,145 | 9/1969 | Lipman | 260/897 A |
| 3,478,005 | 11/1969 | Wheeler | 526/281 |
| 3,640,981 | 2/1972 | Davis | 526/233 |
| 3,642,636 | 2/1972 | Bacskai | 252/59 |
| 3,654,250 | 4/1972 | Davis | 526/237 |
| 3,725,506 | 4/1973 | Bolte | 526/173 |
| 3,753,961 | 8/1973 | St. Cyr | 526/185 |

FOREIGN PATENT DOCUMENTS

| | | |
|---|---|---|
| 278,486 | 9/1914 | Germany. |
| 719,098 | 11/1954 | United Kingdom. |
| 778,639 | 7/1957 | United Kingdom. |
| 801,407 | 9/1958 | United Kingdom. |
| 853,848 | 11/1960 | United Kingdom. |
| 880,809 | 10/1961 | United Kingdom. |
| 910,514 | 11/1962 | United Kingdom. |
| 970,374 | 9/1964 | United Kingdom. |

OTHER PUBLICATIONS

Calloway, N. D., "Friedel-Crafts Synthesis", in Chemical Reviews, 1935, vol. 17, pp. 327, 374–377.

Roberts, W. J. and Day, A. R., J. Amer. Chem. Soc., 1950, 72, pp. 1226–1230.

Gonzenbach et al., "Terpene Resins", in Encyclopedia of Polymer Science, vol. 13, pp. 578–579 and 594–595.

*Primary Examiner*—A. Lionel Clingman
*Attorney, Agent, or Firm*—Cushman, Darby & Cushman

[57] ABSTRACT

Styrene is homopolymerized or copolymerized with alpha methyl styrene, preferably in the presence of limonene, with or without t-butyl styrene, using zirconium tetrachloride as the catalyst. The light colored resins formed are useful as [drying] *dry* cleaning sizing agents and in hot melt adhesives.

25 Claims, No Drawings

PREPARATION OF HYDROCARBON RESINS USING ZIRCONIUM TETRACHLORIDE

Matter enclosed in heavy brackets [ ] appears in the original patent but forms no part of this reissue specification; matter printed in italics indicates the additions made by reissue.

The present invention relates to the use of zirconium tetrachloride as a catalyst in polymerizing aromatic vinyl compounds.

More specifically, the present invention is directed to the making of copolymers of styrene with alpha-methyl styrene, or more preferably, terpolymers styrene with alpha-methyl styrene and a third monomer, most preferably limonene. There can also be used other terpenes such as alpha-pinene, beta-pinene or dipentene in place of all or part of the limonene. Normally, the limonene is employed as the more readily available di-limonene. There can also be used in place of the terpene vinyl toluene, e.g., p-vinyl toluene or t-butyl styrene, e.g., p-t-butyl styrene.

There can be formed styrene homopolymers as well as homopolymers of t-butyl styrene, d-limonene, alpha-methyl styrene, etc. There also can be formed tetrapolymers of styrene, t-butyl styrene, alpha-methyl styrene and a terpene, preferably d-limonene although the other terpenes set forth above can be used.

The use of zirconium tetrachloride produces light-colored resins with or without the d-limonene or other third monomer.

One of the advantages of using zirconium tetrachloride as a catalyst is that there are obtained good yields (over 90% based on the monomers) of resins having high melting points, i.e., over 95° C. (Ball and Ring) Thus, resins can be prepared having melting points up to 155° C and even higher with t-butyl styrene homopolymer. In the working examples, the melting points ranged from 103°–120° C. for the styrene homopolymer, the styrene-alpha methyl styrene copolymer, C, styrene-alpha-methyl styrene-d-limonene terpolymer.

When t-butyl styrene is present it generally yields a higher melting product. Thus, the tetrapolymer of styrene, t-butyl styrene, alpha-methyl styrene and di-limonene had a melting point of 125° C, and the homopolymer of t-butyl styrene can be made with a melting point even above 155° C.

The zirconium tetrachloride is usually employed in an amount of 0.1 to 8% by weight of the total polymerizable monomers. The catalyst employed preferably consists of or consists essentially of the zirconium tetrachloride.

The reaction can be carried out over a wide temperature range, e.g., 20 to 55° C with 30°–35° C being preferred. The temperature, however, is not a critical feature of the invention.

If there is utilized aluminum chloride as a replacement for zirconium tetrachloride wherein the catalyst is added to the monomer/solvent (direct method) there is experienced severe flash back, e.g., the localized heat of reaction violently erupts the reaction materials. When there is utilized aluminum chloride wherein the catalyst is first slurried in the solvent then the monomer is added over a period of time (reverse addition method) the resin obtained is low in melting point and yield. Zirconium tetrachloride gives better yields and higher melting points than aluminum chloride.

Boron trifluoride also gave lower melting point/-lower yield resins in reverse additions than zirconium tetrachloride. Zinc chloride was ineffective as a catalyst. Ferric chloride gave a resin which was almost black in color.

Another advantage of the zirconium catalyst resins is that these resins when compounded into a hot melt adhesive exhibit excellent heat age characteristics and in this respect were superior to boron fluoride catalyzed resins.

Applicants have found that when utilizing the reverse addition method using zirconium tetrachloride the yield and melting point are significantly lower than when utilizing the direct method of catalyst addition.

The resins of the invention have utility as dry cleaning sizing agents which are utilized to give body to clothes after dry cleaning. They also are useful in hot melt adhesive compositions, particularly with paraffin wax and resinous ethylene-vinyl acetate copolymers, e.g., Elvax.

Compatibility of the resins of the invention is controlled by the monomer composition of the resin. Styrene in general promotes incompatibility with paraffin wax and ethylene vinyl acetate. Vinyl toluene and p-t-butyl styrene are more compatible than styrene, but not as compatible as limonene styrene. Terpenes such as those set forth above, e.g., d-limonene promote compatibility as does alpha-methyl styrene.

The polymers can also be molded to form cups. The optimum resin does not use a single monomer since styrene by itself produces a 100% yield of a much too incompatible water-white resin. Alpha-methyl styrene by itself produces a resin which has too low a melting point. d-Limonene also by itself produces a soft resin with a poor yield. In order to optimize compatibility, yield, and a melting point it is necessary to judiciously select the proper monomers and ratios.

Applicants have found that for use in hot melt adhesives that the ratio of 10–40 weight percent of styrene and 90–60 weight percent of alpha-methyl styrene is optimum for a copolymer.

In making terpolymers there is generally employed 5 to 50% by weight styrene, 5 to 80% alpha-methyl styrene and 5 to 50% of terpene, e.g., p-limonene or other third component. In making tetrapolymers there is generally employed 5 to 50% styrene, 5 to 80% alpha-methyl styrene, 5 to 60% terpene and 5 to 50% t-butyl styrene.

When the reaction is carried out in a solvent there can be used as solvents, e.g., aromatic hydrocarbon such as xylene, benzene, toluene, or aliphatic hydrocarbons, e.g., heptane or mineral spirits.

Unless otherwise indicated all parts and percentages are by weight.

Example 1

| | |
|---|---|
| A Alpha-methyl styrene | 750 grams |
| B Styrene | 250 |
| C Xylene | 650 |
| D Zirconium tetrachloride | 10 |
| E Water | 100 |
| F Water | 100 |
| G Water | 100 |

Materials A, B, and C were placed in a three-neck flask equipped with agitator, reflux condenser and thermometer. The temperature was brought to 30° C. and Material D was added over 20 minutes. The temperature was controlled by cooling to maintain 30°-35° C. The reaction was held at 30°-35° C for one hour and then material E was added. The mixture was stirred for ½ hour, then the bottom water layer was removed. The resin solution was subsequently washed with materials F and G similarly. The resin was then distilled atmospherically to 200° C. yielding a water-white resin with a melting point of 103° C. and a yield of 960 grams. (96%)

Example 2

| | |
|---|---|
| A Alpha methyl styrene | 333 grams |
| B Styrene | 333 |
| C d-limonene | 333 |
| D Xylene | 650 |
| E Zirconium tetrachloride | 20 |
| F Water | 100 |
| G Water | 100 |
| H Water | 100 |

Materials A, B, C, and D were placed in a three-liter, three-necked flask equipped as in Example 1. The temperature was brought to 30° C. and Material E was added over 20 minutes controlling the temperature at 30°-35°. The reaction proceeded for 1 hour at 30°-35°. Then material F was added. The mixture was stirred at 75° C. for ½ hour. The layers were separated and the bottom water layer was removed. Material G was added and the resin solution was again washed and the water layer removed. Material H was similarly utilized to wash the resin solution. The resin was then distilled atmospherically to 200° C. then steamed with indirect steam for 15 minutes. The yield was 950 grams (95%), MP was 120° C., and the color was less than 1 on the Gardner Scale.

Example 3

| Hot Melt adhesive Formulation | |
|---|---|
| A Paraffin Wax | 25 parts |
| B Resin | 40 parts |
| C Elvax 260* | 35 parts |

Ethylene vinyl acetate copolymer, melt index (5-6), vinyl acetate content 28% product of E.I.DuPont de Nemours

Procedure

Load A into a 250 ml Beaker. Bring to 300° F. and gradually add B to dissolve it. Add C gradually keeping the temperature at 325° to 350° F. Hold with agitation until the mixture is homogeneous.

Thermal Stability Studies

Hot melt adhesives were prepared using the formulation of Example 3. The resins of Examples 1 and 2 were compared with commercially available hot melt resins for resistance to thermal degradation showing their much increased resistance to color change and resistance to skimming.

Then grams of hot melt sample was placed in an aluminum weighing dish with an exposed surface area of approximately three square inches. The dish was placed in an oven at 350° F. for 96 hours. The condition of the hot melt adhesive was noted upon removal from the oven and compared with an original sample for color change and skimming. The less skim and the lighter the color the better the aging character.

| | Original | | Aged at 350° F. for 96 hours | |
|---|---|---|---|---|
| | Color | Skim | Color | Skim |
| Example 1 | White | None | Egg white | None |
| Example 2 | White | None | Off white | None |
| CRJ-683(1) | Grey brown | None | Black | Small Amount |
| Wingtac 95(2) | Light yellow | None | Black | Small Amount |
| ST-5115(3) | Yellow | None | Dark brown | Medium Amount |

(1)CRJ-683 is a commercially available piperylene stream resin having a MP of 95° C. manufactured by Schenectady Chemicals, Inc.
(2)Wingtac-95 is a commercially available piperylene resin manufactured by Goodyear Chemical with a MP of 95° C.
(3)ST-5115 is a commercially available terpene resin (a beta pinene resin) melting at 115° C. manufactured by Schenectady Chemicals, Inc.

The cloud point of a hot melt adhesive, i.e., the temperature at which the molten adhesive becomes turbid, is controlled by the ratios of monomers in the resin. For example:

| | | | | |
|---|---|---|---|---|
| d-limonene (grams) | 38 | 35 ½ | 34 ½ | 33 ½ |
| Alpha-methyl styrene (grams) | 38 | 35 ½ | 34 ½ | 33 ½ |
| Styrene (grams) | 24 | 29 | 31 | 33 ½ |
| Cloud point of hot melt adhesive | 145° F. | 160° F. | 186° F. | 230° F. |

As can be seen, minor changes in the percentage of styrene cause major changes in compatibility (cloud point). The above resins all utilized two percent zirconium tetrachloride as a catalyst (based on total monomers) and they were produced similarly to Example 2.

Example 4

| | |
|---|---|
| A p-t-butyl styrene | 750grams |
| B Styrene | 250 |
| C Xylene | 650 |
| D Zirconium Tetrachloride | 3.5 |
| E Water | 100 |
| F Water | 100 |
| G Water | 100 |

The above formulation was processed in a similar manner to Example 1 yielding 997 grams of water white resin with a melting point of 155° C.

Example 5

| | |
|---|---|
| A alpha methyl styrene | 750grams |
| B Styrene | 250 |
| C Heptane | 650 |
| D Zirconium Tetrachloride | 5 |
| E Water | 100 |
| F Water | 100 |
| G Water | 100 |

The above formulation was processed in a similar manner to Example 1 yielding 978 grams of a water white polymer with a melting point of 120° C.

Example 6

| | |
|---|---|
| A Styrene | 1000grams |
| B Xylene | 650 |
| C Zirconium Tetrachloride | 5 |
| D Water | 100 |
| E Water | 100 |
| F Water | 100 |

The above ingredients were processed in a similar manner to Example 1 yielding 1042 grams of a water white resin with a melting point of 110° C.

Example 7

| | |
|---|---|
| A Styrene | 250 grams |
| B p-t-butyl styrene | 250 |
| C alpha methyl styrene | 250 |
| D d-limonene | 250 |
| E Xylene | 650 |
| F Zirconium Tetrachloride | 10 |
| G Water | 100 |
| H Water | 100 |
| I Water | 100 |

The above formulation was processed in a similar manner to Example 1 with A, B, C [and] D *and E* being placed in flask initially yielding 1011 grams of a water white resin with a melting point of 125° C.

The ranges of proportions of terpolymers and tetrapolymers can be varied at the will of the synthesizer. Normally the blends of monomers are selected to obtain whatever solubility parameter is desired. It is even possible to prepare viscous liquid polymers, e.g., homopolymers of d-limonene, which are useful as adhesives.

What is claimed is:

[1. A process of preparing a light colored aromatic vinyl resin comprising polymerizing a member of the group consisting of (1) as the sole monomer styrene, alpha-methyl styrene, alpha-pinene, beta-pinene, di-pentene limonene or p-t-butyl stryene; (2) a mixture of (a) styrene and (b) alpha-methyl styrene; or (3) a mixture of (a) styrene, (b) alpha-methyl styrene and (c) as a third monomer a member of the group consisting of alpha-pinene, beta-pinene, dipentene limonene p-t-butyl styrene and vinyl toluene; or (4) a mixture of (a) styrene, (b) alpha-methyl styrene, (c) polymerizable terpene selected from the group consisting of alpha-pinene, beta-pinene, dipentene and limonene and (d) p-t-butyl styrene, in the presence of zirconium tetrachloride as a catalyst.]

[2. The product prepared by the process of claim 1.]

[3. A process according to claim 1 wherein the catalyst consists essentially of zirconium tetrachloride in an amount of 0.1 to 8% of the total monomers.]

4. A process according to claim [3] *35* wherein there is employed 10 to 40% styrene and 90 to 60% alpha-methyl styrene.

5. The product prepared by the process of claim 4.

6. A process according to claim 4 wherein there is employed 25% styrene and 75% alpha-methyl styrene.

7. The product prepared by the process of claim 6.

8. A process according to claim 6 wherein the zirconium tetrachloride is used in an amount of 2% based on the total monomers.

9. A process according to claim 3 wherein there is employed 5 to 50% styrene, 5 to 80% alpha-methyl styrene and 5 to 50% of said third monomer, [alpha-pinene, beta-pinene, dipentene,] limonene, p-t-butyl styrene or vinyl toluene.

10. The product prepared by the process of claim 9.

[11. A process according to claim 9 wherein said third monomer is alpha-pinene, beta-pinene, dipentene or limonene.]

12. A process according to claim [11] *9* wherein said third monomer is d-limonene.

13. The product prepared by the process of claim 12.

14. A process according to claim 12 wherein there is employed 33⅓ to 38% d-limonene, 33⅓ to 38 alpha-methyl styrene and 33⅓ to 24% styrene.

15. The product prepared by the process of claim 14.

16. A process according to claim 14 wherein there is employed 2% of zirconium tetrachloride based on the total monomers.

17. A process according to claim 14 wherein there is employed equal parts of d-limonene, alpha-methyl styrene and styrene.

18. The product prepared by the process of claim 17.

19. A process according to claim 17 wherein there is employed 2% of zirconium tetrachloride based on the total monomers.

20. A process according to claim [3] *35* carried out in a hydrocarbon solvent.

21. A process according to claim 20 wherein the monomers are dissolved in the solvent and then the zirconium tetrachloride is added.

22. A process according to claim [3] *35* wherein there is polymerized a mixture of (a) styrene, (b) alpha-methyl styrene, [(c) a polymerizable terpene selected from the group consisting of alpha-pinene, beta-pinene, dipentene and] limonene, and (d) p-t-butyl styrene.

23. The product prepared by the process of claim 22.

24. A process according to claim [3] *35* wherein there is polymerized styrene or alpha-methyl styrene.

25. The product prepared by the process of claim 24.

26. A process according to claim 24 wherein there is prepared a homopolymer of styrene.

27. A process according to claim 24 wherein there is prepared a homopolymer of t-butyl styrene.

[28. A process according to claim 1 wherein the polymerization is carried out at a temperature of 20° to 55° C.]

[29. A process according to claim 28 which is carried out in a aromatic hydrocarbon solvent.]

[30. A process according to claim 28 which is carried out in xylene, benzene, toluene, heptane and mineral spirits as a solvent.]

[31. A process according to claim 1 wherein the polymerization is carried out in an aromatic hydrocarbon solvent.]

[32. A process according to claim 1 wherein the polymerization is carried out in xylene, benzene, toluene, heptane or mineral spirits as a solvent.]

[33. A process according to claim 1 wherein the catalyst consists essentially of zirconium tetrachloride in an amount of 0.1 to 8% of the total monomers, and there is polymerized a mixture of (a) styrene, (b) alpha-methyl styrene, (c) a polymerizable terpene selected from the group consisting of alpha-pinene, beta-pinene, dipentene and limonene and (d) p-t-butyl styrene.]

[34. A process according to claim 33 wherein the terpene is limonene.]

*35. A process of preparing a light colored aromatic vinyl resin comprising polymerizing a member of the group consisting of (1) as the sole monomer styrene, alpha-methyl styrene or p-t-butyl styrene; (2) a mixture of (a) styrene and (b) alpha-methyl styrene; or (3) a mixture of (a) styrene, (b) alpha-methyl styrene and (c) as a third monomer a member of the group consisting of limonene, p-t-butyl styrene and vinyl toluene, and (4) a mixture of (a) styrene, (b) alpha-methyl styrene, (c) limonene and (d) p-t-butyl strene, in the presence of a catalyst consisting essentially of zirconium tetrachloride in an amount of 0.1 to 8% of the total monomer.*

*36. A process of preparing a light colored aromatic vinyl resin comprising polymerizing a member of the group consisting of (1) as the sole monomer styrene, alpha-methyl styrene or p-t-butyl styrene; (2) a mixture of (a) styrene and (b) alpha-methyl styrene; or (3) a mixture of 5 to 50% of (a) styrene, 5 to 80% of (b) alpha-methyl styrene, and 5 to 50% of (c) as a third monomer a member of the group consisting of limonene, alpha-pinene, beta pinene, dipentene, p-t-butyl styrene and vinyl toluene; or (4) a mixture of (a) styrene, (b) alpha-methyl styrene, (c) limonene and (d) p-t-butyl styrene, in the presence of a catalyst consisting essentially of zirconium tetrachloride in an amount of 0.1 to 8% of the total monomer.*

* * * * *